UNITED STATES PATENT OFFICE.

CHARLES SCHINZ, OF CAMDEN, NEW JERSEY.

IMPROVEMENT IN PROCESSES FOR HARDENING TALLOW.

Specification forming part of Letters Patent No. 11,087, dated June 13, 1854.

*To all whom it may concern:*

Be it known that I, CHS. SCHINZ, consulting chemist, of Camden, in the county of Camden and State of New Jersey, have discovered a Process for Hardening Fats; and I do hereby declare that the following is a full and exact description of said process.

The nature of my discovery consists in the use of such sulphites or nitrites as have the property of being decomposed in contact with the fats at a boiling temperature in forming either basic or acid salts, in which cases a part of the acid contained in the salts acts upon the oleine or elaine contained in the fats and converts thereby the last-named substance into elaidine.

To enable others skilled in the art of melting and preparing fats to make use of my discovery, I will proceed to describe its operation.

The salts which I have found to answer best the purpose are the neutral nitrite of lead, the neutral nitrite of ammonia, and the acid sulphite of ammonia. The quantities of these salts used for hardening fats vary according to the quantities of oleine contained in them to the degree of hardness required and the temperature of the season; but it may be laid down as a rule that these quantities—for tallow, for instance—may be fixed thus: that from one-third to one-half pound of sulphurous or nitrous acid contained in the salts are sufficient to harden one hundred pounds of tallow. As these salts are to be prepared by manufacturing chemists, and are mostly obtainable only as solutions—not in a dry state—the manufacturers have to indicate the strength of their liquors and the quantities of acids contained in them. A strong solution of nitrite of lead contains but four one-hundredths of a pound of nitrous acid in the gallon. Therefore one hundred pounds of tallow require about eight gallons of such a liquor. The nitrite and sulphite of ammonia are much more soluble in water, as one gallon of their strong solution contains two and one-fourth pounds nitrous and one and one-third pound sulphurous acid, and therefore one gallon of such a solution of nitrite of ammonia hardens from four hundred and fifty pounds to six hundred and seventy-five pounds of tallow, and one gallon of such a solution of sulphite of ammonia two hundred and sixty-six pounds to four hundred pounds. The solution of any of these salts is with the fats introduced into a tub or kettle and brought to ebullition, either by direct heat or by a stream of steam. The ebullition must be strong enough to bring in full contact and action the ingredients with the fat, and must be kept up for about one hour. After the mixture has again cooled a certain quantity of impurities are found at the bottom of the hardened fat-cake, which are scraped off and boiled with water, so as to leave the pure fat at the surface, by which means no part of the fat is lost.

The fact that nitrous acid as well as sulphurous acid convert oleine or elaine into elaidine has been recorded in science since the year 1833, and discovered by Boudet, and therefore I do not claim this as my discovery; but what I do claim is the application of this principle to the purpose of hardening fats, and to have found out processes for doing this which are not only practicable, but also cheap enough to allow their general adoption.

What I claim as my invention, and desire to secure by Letters Patent, is—

The use of compounds which slowly and to a determined amount generate, in contact with the fats to be hardened, nitrous or sulphurous acid, and which convert the fats into matters less fusible and harder than the fats or fatty acids employed.

CHS. SCHINZ.

Witnesses:
CHS. W. FUNK,
WERNER ZOLLIKOFER.